(12) United States Patent
Fleming et al.

(10) Patent No.: US 9,050,989 B2
(45) Date of Patent: Jun. 9, 2015

(54) FOLDABLE PASSENGER CARRIER

(71) Applicant: THULE CHILD TRANSPORT SYSTEMS LTD, Calgary (CA)

(72) Inventors: Wesley Justin Fleming, Calgary (CA); Daniel W. Britton, Calgary (CA); Garner Elliot Meszaros, Langdon (CA); Roger Wayne McPherson, Calgary (CA)

(73) Assignee: Thule Child Transport Systems Ltd., Alberta (CA)

( * ) Notice: Subject to any disclaimer, the term of this patent is extended or adjusted under 35 U.S.C. 154(b) by 0 days.

(21) Appl. No.: 13/629,150

(22) Filed: Sep. 27, 2012

(65) Prior Publication Data

US 2014/0015209 A1 Jan. 16, 2014

(30) Foreign Application Priority Data

Jul. 13, 2012 (EP) .................................... 12176343

(51) Int. Cl.
  *B62B 7/06* (2006.01)
  *B62B 7/04* (2006.01)
  *B62B 7/08* (2006.01)
  *B62B 7/12* (2006.01)

(52) U.S. Cl.
  CPC . *B62B 7/044* (2013.01); *B62B 7/08* (2013.01); *B62B 7/126* (2013.01); *B62B 7/046* (2013.01); *B62B 2205/12* (2013.01)

(58) Field of Classification Search
  USPC .......................... 280/642–643, 647, 648, 650, 280/47.38–47.41, 657–65
  See application file for complete search history.

(56) References Cited

U.S. PATENT DOCUMENTS

| | | | |
|---|---|---|---|
| 3,271,048 | A | 9/1966 | Beesley et al. |
| 4,028,773 | A | 6/1977 | Morgan |
| 5,267,744 | A | 12/1993 | Berry et al. |
| 5,344,171 | A | 9/1994 | Garforth-Bles |
| 5,474,316 | A | 12/1995 | Britton |
| 5,522,639 | A | 6/1996 | Jaime |
| D375,706 | S | 11/1996 | Haung |

(Continued)

FOREIGN PATENT DOCUMENTS

| | | |
|---|---|---|
| CN | 201350918 | 11/2009 |
| DE | 19832259 | 1/2000 |

(Continued)

OTHER PUBLICATIONS

Extended European Search Report for European Patent Application No. 12176350.2 dated Jan. 24, 2013, 6 pages.

(Continued)

*Primary Examiner* — Jeffrey J Restifo
*Assistant Examiner* — Erez Gurari
(74) *Attorney, Agent, or Firm* — Sheridan Ross P.C.

(57) ABSTRACT

A foldable passenger carrier, such as an infant stroller, comprising a carrier frame with a frame body and at least one longitudinal frame element comprising a folding hinge with a locking mechanism in the folding hinge. The carrier further comprises a push-handle which is connected to the upper part of the frame body and comprises a handle adjustment hinge with a locking mechanism. The push-handle is foldable towards the forward part of the frame body at the handle adjustment hinge and the longitudinal frame element is foldable in a direction towards the lower part of the frame body at the folding hinge.

17 Claims, 5 Drawing Sheets

(56) References Cited

U.S. PATENT DOCUMENTS

| | | |
|---|---|---|
| 5,577,746 A | 11/1996 | Britton |
| 5,799,756 A | 9/1998 | Roberts et al. |
| D408,768 S | 4/1999 | Baechler et al. |
| D442,895 S | 5/2001 | Chiu |
| D452,195 S | 12/2001 | Baechler |
| 6,345,835 B1 * | 2/2002 | Watkins ................. 280/650 |
| 6,368,006 B1 | 4/2002 | Yang et al. |
| 6,402,166 B1 | 6/2002 | Chiu |
| 6,435,622 B1 | 8/2002 | Kanehisa et al. |
| 6,634,665 B2 | 10/2003 | Hargroder |
| D481,976 S | 11/2003 | Everett |
| 6,671,926 B2 | 1/2004 | Huang |
| 6,722,690 B2 * | 4/2004 | Lan ......................... 280/642 |
| 6,863,297 B2 | 3/2005 | Shapiro |
| 6,893,040 B2 | 5/2005 | Hou et al. |
| 6,976,697 B2 * | 12/2005 | Britton et al. ............. 280/647 |
| 7,011,321 B2 | 3/2006 | Hargroder |
| D519,063 S | 4/2006 | Chang |
| 7,077,420 B1 * | 7/2006 | Santoski ................. 280/642 |
| D529,844 S | 10/2006 | Chen et al. |
| D558,099 S | 12/2007 | Yang |
| D564,948 S | 3/2008 | Liu |
| D585,338 S | 1/2009 | Siewertsen |
| D592,373 S | 5/2009 | Evans et al. |
| 7,527,283 B2 * | 5/2009 | Horacek ................. 280/642 |
| 7,547,029 B2 * | 6/2009 | Britton et al. ............. 280/204 |
| D599,257 S | 9/2009 | Gower et al. |
| 7,686,322 B2 * | 3/2010 | Longenecker et al. ....... 280/642 |
| D615,461 S | 5/2010 | Storm |
| 7,766,368 B2 * | 8/2010 | Tsai ......................... 280/649 |
| 7,845,671 B2 * | 12/2010 | Cone, II ................. 280/650 |
| 7,891,696 B2 * | 2/2011 | Hanson ................. 280/647 |
| D633,825 S | 3/2011 | van Leeuwen et al. |
| 8,205,906 B2 * | 6/2012 | Kretschmer et al. .......... 280/642 |
| 8,205,907 B2 * | 6/2012 | Chicca ................. 280/642 |
| D687,352 S | 8/2013 | Shellenberger et al. |
| 2007/0262566 A1 * | 11/2007 | Hartenstine et al. .......... 280/642 |
| 2008/0079240 A1 * | 4/2008 | Yeh ......................... 280/642 |
| 2008/0143076 A1 | 6/2008 | Klevana et al. |
| 2009/0008908 A1 * | 1/2009 | Kassai et al. ............. 280/647 |
| 2009/0127828 A1 | 5/2009 | Longenecker et al. |
| 2010/0244405 A1 | 9/2010 | Assaf |
| 2011/0012325 A1 * | 1/2011 | Gower et al. ............. 280/648 |
| 2011/0316258 A1 | 12/2011 | Lin |
| 2012/0025495 A1 * | 2/2012 | Minato et al. ............. 280/648 |
| 2012/0056408 A1 * | 3/2012 | Wu et al. ................. 280/642 |
| 2012/0086189 A1 | 4/2012 | Wu |
| 2012/0200052 A1 | 8/2012 | Shapiro |
| 2013/0119641 A1 * | 5/2013 | Hu et al. ................. 280/642 |
| 2013/0119643 A1 * | 5/2013 | Gower et al. ............. 280/650 |
| 2013/0154241 A1 * | 6/2013 | Parkinson et al. .......... 280/650 |

FOREIGN PATENT DOCUMENTS

| | | |
|---|---|---|
| DE | 102010010966 | 9/2011 |
| EP | 0913312 | 5/1999 |
| EP | 1162134 | 12/2001 |
| EP | 2017158 | 1/2009 |
| NL | 1018648 | 2/2003 |
| WO | WO 98/47753 | 10/1998 |

OTHER PUBLICATIONS

Official Action for U.S. Appl. No. 13/629,158 mailed May 9, 2013, 5 pages.
U.S. Appl. No. 13/629,158, filed Sep. 27, 2012, Fleming et al.
U.S. Appl. No. 13/629,143, filed Sep. 27, 2012, Britton et al.
U.S. Appl. No. 29/440,568, filed Dec. 21, 2012, Britton et al.
Official Action for U.S. Appl. No. 13/629,143 mailed Dec. 31, 2013, 6 pages.
Official Action for U.S. Appl. No. 13/629,143 mailed May 7, 2014, 10 pages.
Notice of Allowance for U.S. Appl. No. 29/440,568 mailed Dec. 20, 2013, 11 pages.
U.S. Appl. No. 14/223,713, filed Mar. 24, 2014, Fleming et al.
Notice of Allowance for U.S. Appl. No. 13/629,158 mailed Nov. 22, 2013, 7 pages.
Official Action for U.S. Appl. No. 29/440,568 mailed Oct. 2, 2013, 6 pages.
Official Action for U.S. Appl. No. 13/629,143, mailed Sep. 30, 2014 12 pages.

* cited by examiner

FOLDABLE PASSENGER CARRIER

CROSS REFERENCE TO RELATED APPLICATIONS

This application claims the benefit of European Patent Application No. 12176343.7, filed Jul. 13, 2012, the entire disclosure of which is incorporated by reference herein.

TECHNICAL FIELD

The invention pertains to foldable passenger carriers, e.g. infant strollers, of the type comprising a carrier frame and having a frame body delimiting a passenger space and being provided with a push-handle, allowing the carrier to be pushed by a walking, running or skiing person. The upper part of the frame body comprises at least one longitudinal frame element and the longitudinal frame element and the push-handle are provided with hinges allowing the passenger carrier to be folded into a compact configuration for transport and storage. The invention also concerns a method for folding a foldable infant stroller into a transport and storage configuration.

BACKGROUND OF THE INVENTION

A foldable passenger carrier has previously been described in NL1018648. The passenger carrier in NL1018648 is an infant stroller having a foldable frame and being provided with a handle bar having an adjustment hinge arranged at each side of the handle bar allowing the angle of the handle bar to be adjusted. The adjustment hinges may also be used to fold the handle bar down towards the rear of the infant stroller when the stroller is to be converted into a transport and storage configuration. Further folding hinges that are used to transform the carrier into a compact configuration are provided in the carrier frame itself.

Bicycle trailers adapted to be coupled to the rear of a bicycle and to be pulled after the bicycle, are commonly equipped to be used both as bicycle trailers and as manually pushed passenger carriers such as infant strollers. A combined stroller and bicycle trailer has been described in DE 102010010966 A1. Other examples of convertible bicycle trailers are found in EP1162134 A1 and U.S. Pat. No. 5,267,744 A. It is generally desired that such multi-purpose passenger carriers are foldable so that they may be transported and stored in a practical and space-efficient manner.

It is an object of the present invention to provide a passenger carrier having an improved foldability requiring a minimum of manual operations to be performed when folding or unfolding the passenger carrier.

SUMMARY OF THE INVENTION

In accordance with the invention there is offered a foldable passenger carrier, such as an infant stroller, comprising a carrier frame and having a longitudinal direction constituting a travelling direction of the passenger carrier, a transverse direction perpendicular to the longitudinal direction and a height direction perpendicular to the longitudinal direction and to the transverse direction. The carrier frame comprises a frame body having a forward part and a rear part in the longitudinal direction and an upper part and a lower part in the height direction. The upper part of the frame body comprises a longitudinal frame element comprising a folding hinge with a locking mechanism and the carrier comprises a push-handle which is connected to the upper part of the frame body and comprises a handle adjustment hinge with a locking mechanism. The push-handle is foldable towards the forward part of the frame body at the handle adjustment hinge and the longitudinal frame element is foldable in a direction towards the lower part of the frame body at the folding hinge.

Accordingly, the passenger carrier of the invention may comprise one or more foldable generally longitudinally extending frame elements that are provided with hinges comprising mechanisms for locking and releasing the hinges. In order to allow the upper part of the carrier frame to be collapsed inwardly, in a direction towards the lower part of the carrier frame, all longitudinally extending frame elements should be provided with folding hinges. When the hinges are released they become free to move in a manner resembling that of a buckling knee, implying that the distance between the endpoints of each frame element is decreased.

The push-handle may be of the of the commonly used kind comprising a handle bar extending straight or curved in the transverse direction of the push-carrier and being connected to the upper part of the frame body at the sides of the frame body. The connection may be at two adjustment hinges each comprising a locking mechanism allowing the angle and height of the gripping part to be adjusted to a desired position suiting a particular user. Alternatively, the passenger carrier may have one handle at each side of the passenger compartment or a combination of a loop-shaped push-handle and side handles or even a handle bar being connected to the upper part of the frame body by a single centrally arranged frame element. In all instances, the push-handle is provided with an appropriate number of lockable adjustment hinges allowing adjustment of the push-handle as well as folding of the push-handle in a forward direction of the passenger carrier.

Furthermore, the upper part of the frame body may comprise two or more longitudinal frame elements, wherein each longitudinal frame element comprises a folding hinge with a locking mechanism.

The locking mechanisms in the handle adjustment hinges and in the folding hinges in the longitudinal frame elements are arranged to be activated when the passenger carrier is in an in-use mode and serve to secure the passenger carrier in an un-folded in-use configuration. The locking mechanisms are further arranged to be manually deactivated, allowing folding at the hinges in order to collapse the frame body towards the lower part of the carrier frame and to fold the push-handle forwards.

The passenger carrier of the invention preferably comprises a single manually operated control mechanism acting on all locking mechanisms in the hinges to release and lock the hinges as required. The single control mechanism may be arranged on the push-handle. By placing the control mechanism centrally on the push-handle, as seen in the horizontal direction of the passenger carrier, a person folding or unfolding the passenger carrier can easily operate the mechanism when standing in a push-position behind the passenger carrier. Once the control mechanism has been used to release the locking mechanisms for the handle adjustment hinges, the push-handle can be folded forward by simply leaning forward and pushing at the handle. Preferably, the locking mechanisms for the hinges on the frame elements are coupled in series with the locking mechanisms for the push-handle so that forward movement of the push-handle triggers the frame element locking mechanisms. Furthermore, a forward and downward movement of the push-handle contributes bending the longitudinal frame elements downward at the folding hinges when collapsing the frame body. Unfolding of the passenger carrier can be performed in an equally simple and convenient manner by standing behind the passenger carrier and pulling the push-handle upwards and rearwards when the hinge locking mechanisms are in a released position.

The single control mechanism may be connected to the locking mechanisms in the hinges by means of wires arranged in the carrier frame. Wire operated lockable hinge mechanisms are well known in the art, for instance from NL1018648 or WO9847753.

The passenger carrier may further have a lower front part of the carrier frame connected to a lower rear part of said carrier frame at front part hinges, whereby the lower front part of the carrier frame is arranged to be rotated at the front part hinges in a direction towards the lower rear part of the carrier frame. A foldable front part of the passenger carrier makes it possible to fold the passenger carrier into an ever more compact storage and transport configuration. The foldable longitudinal frame elements in the upper part of the carrier body may be mounted to the foldable lower front part of the carrier frame so that they act as levers on the foldable lower front part. In this manner, folding of the longitudinal frame elements in a direction towards the lower part of the carrier frame will cause the foldable front part to rotate into the storage and transport position.

The carrier may further comprise one or more front wheels arranged on the forward part of the carrier frame. It is common that a front wheel on a push-carrier is pivotably attached to the frame body so that it can rotate around an axis in the height direction of the passenger carrier. The front wheel or front wheels may be connected to the frame body by means of a connecting member comprising a front hinge with a hinge axis extending in the transverse direction of the passenger carrier, whereby the front wheel is foldable around the hinge axis towards the rear part of the frame body, in under the lower part of the frame body. The front wheel may be provided with an arrangement for locking the front wheel in a position parallel with the transverse direction of the passenger carrier, i.e. perpendicular to the travelling direction of the passenger carrier, in order to allow the wheel to be folded in flat against the bottom of the passenger carrier. Furthermore, the front wheel may be provided with an arrangement for locking the front wheel in the folded storage position.

A front wheel arranged on the forward part of the carrier frame may be removably attached to the frame body or may be arranged to provide a choice between folding the wheel into a storage position as disclosed herein or removing the wheel altogether. A foldable or removable front wheel can further reduce the size of a foldable passenger carrier when the passenger carrier is in a collapsed transport and storage configuration. Moreover, the passenger carrier according to the invention may be a multi-function push-carrier and bicycle trailer. A front wheel is only needed when the carrier is used as a stroller or manually pushed cart. When the carrier is used in the trailer mode and is coupled to a bicycle, the front wheel is not needed and is generally not even wanted as it is unsuitable for the speeds attained when the trailer is pulled after the bicycle. Furthermore, if left hanging down from the frame when the carrier is coupled to a bicycle the wheel may be hit by stones and other items on the ground over which the carrier is pulled. Accordingly, it may be advantageous to be able to fold any front wheel into a storage position when the multi-function carrier is used in a trailer mode or to be able to completely remove the front wheel or front wheels.

The invention also offers a method for folding a foldable push-carrier as set out above. The method includes the steps of:

a) releasing the locking mechanism or the locking mechanisms in the handle adjustment hinge or the handle adjustment hinges;

b) folding the push-handle at the adjustment hinge or the adjustment hinges towards the front part of the frame body;

c) releasing the locking mechanism or the locking mechanisms in the longitudinal frame element folding hinge or folding hinges; and d) folding the longitudinal frame element or frame elements at the folding hinge or folding hinges towards the lower part of the frame body.

The locking arrangements in the hinges may be constructed to allow steps a) and c) to be performed simultaneously.

Furthermore, steps b) and d) may be performed simultaneously in a single continuous folding operation wherein folding the push-handle forwards aids in collapsing the longitudinal frame elements in a direction towards the lower part of the frame body.

Unfolding of the collapsed passenger carrier is performed in a reverse manner by moving the push-handle in a direction upwards and rearwards until the push-handle and the longitudinal frame elements can be locked in the in-use position.

The invention allows the passenger carrier to be quickly and conveniently folded and unfolded in a logical and intuitive manner, requiring very few manual operations to be performed in order to transform the carrier between the unfolded and the folded state.

As set out herein, the foldable passenger may comprise at least one front wheel which is connected to the frame body by means of a connecting member comprising a front hinge. The folding method may then include the further step of folding the front wheel at the front hinge towards the rear part of the frame body, in under the lower part of the frame body.

The method may also comprise the further step of folding a lower front part of the carrier frame which is connected to a lower rear part of the carrier frame at front part hinges in a direction towards the lower rear part of the carrier frame at the front part hinges.

DEFINITIONS

The term "multi-function passenger carrier" refers to a vehicle that can be used either as a bicycle trailer or as a push-carrier by a person walking, running, jogging or skiing.

By a horizontal direction as used herein is implied a direction in a horizontal plane of a passenger carrier when in an in-use-position, i.e. while being pulled after a bicycle or being pushed by a person.

By a vertical direction as used herein is implied a direction in a vertical plane through a passenger carrier when in an in-use position, i.e. while being pulled after a bicycle or being pushed by a person.

By a front part of a passenger carrier or a carrier frame as used herein is implied a part that is intended to be facing forward in the travelling direction, either towards a bicycle if the passenger carrier is coupled to a bicycle or to be facing away from a pusher of the passenger carrier when it is used as a push carrier.

A back or rear part of a passenger carrier is a part opposite to the front part and intended to be facing away from a bicycle or towards a person depending on how the passenger carrier is being used.

An upper part of a passenger carrier or carrier frame is a part facing upward, away from the ground when the passenger carrier is in an in-use position.

A lower part of a passenger carrier or carrier frame is a part facing downward towards the ground when the passenger carrier is in an in-use position.

A travelling direction of a passenger carrier is a direction in which the passenger carrier is designed to be moved. The travelling direction corresponds to a longitudinal direction of the passenger carrier, and is perpendicular to the transverse direction and the height direction of the passenger carrier.

Positional terms such as "upper", "lower", "underside", etc. when used herein to describe the location of an element should be understood as referring to a passenger carrier when in a position for use as a trailer or a push-carrier. Positional terms are used in a corresponding way to describe the relative positioning of elements in a passenger carrier in an in-use position.

A carrier frame, as used herein is a structure comprising frame elements defining general shape of the passenger carrier. The carrier frame includes the push-handle but not any wheels, passenger seats, covering, etc. or any removable equipment or accessories. The frame body refers to the part of the carrier frame surrounding the passenger space. The frame body does not include the push-handle.

BRIEF DESCRIPTION OF THE DRAWINGS

The invention will be described in greater detail with reference to the appended drawings in which.

DETAILED DESCRIPTION

The invention is described below with reference to a multi-functional passenger carrier in the form of a combined push-carrier and bicycle trailer. However, it is to be understood that the invention is equally applicable to passenger carriers which are not equipped to be used as bicycle trailers, such as infant strollers, baby prams, jogging strollers, etc.

Figure 1:
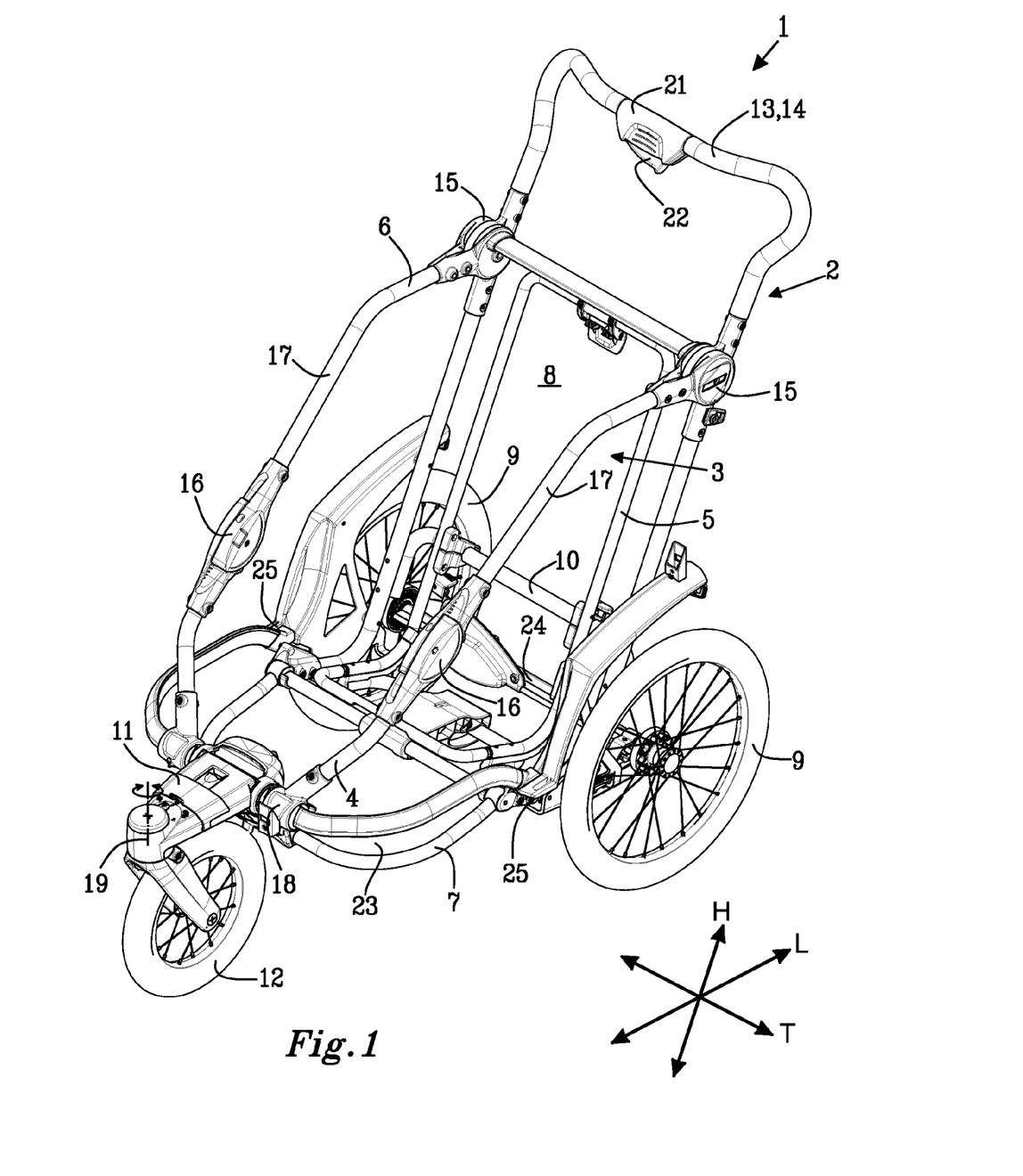
FIG. 1 shows a perspective view of a passenger carrier according to the invention without any covering or accessory equipment.

The passenger carrier 1 in FIG. 1 is shown without any covering or accessories, revealing the structure of the carrier frame 2. The carrier frame comprises a carrier body 3 defining the shape of a passenger compartment 8. The carrier body 3 has a front part 4, a rear part 5, an upper part 6 and a lower part 7 as seen in FIG. 1. The passenger carrier 1 is a multi-function passenger carrier that can be used in a trailer mode, coupled to the rear end of a bicycle, or in a push-carrier mode allowing the carrier to be pushed by a person while walking, running, skiing, etc. The passenger carrier 1 in FIG. 1 is shown in the push-carrier mode, i.e. without any connection to a bicycle. Apart from the trailer frame 2 and a covering, the passenger carrier 1 comprises two rear wheels 9 mounted on a horizontal rear axis 10 and a front wheel arrangement 11 with a front wheel 12 pivotably mounted at the front part 4 of the carrier body 3. When the passenger carrier 1 is in the trailer mode, it can be coupled to the rear end of a bicycle by means of a coupling device arranged on the passenger carrier 1.

The passenger carrier 1 has a longitudinal direction, L, which is also the travelling direction of the passenger carrier 1, a transverse direction, T, perpendicular to the longitudinal direction, L, and a height direction, H perpendicular to both the longitudinal direction, L, and the transverse direction, T.

The bicycle trailer frame 2 further comprises a push-handle 13 connected to the rear part 5 of the frame body 3. The push-handle 13 is shown with a generally horizontally arranged central handle bar 14. The push-handle 13 is shown to form an arch-like connection between two handle adjustment hinges 15 placed at the upper part 6 of the frame body 3, at each side of the passenger compartment 8 defined inside the frame body 3. The handle adjustment hinges 15 are lockable adjustment hinges, implying that they are provided with a locking mechanism that can be set to a locked position, allowing the push-handle 13 to be locked in a desired position in relation to the frame body 3 and that can be released, allowing the push-handle 13 to be moved to a new gripping position or to be folded from a gripping position towards the forward part 4 of the frame body 3 into a storage position or rearwards from a storage position into a gripping position.

The passenger carrier 1 in FIG. 1 is of the type that can be converted into a compact transport and storage configuration by folding the trailer frame 2 at lockable hinges 16 arranged in frame elements 17 extending in the longitudinal direction, L, of the passenger carrier 1 and at the lockable handle adjustment hinges 15 arranged on the upper part 6 of the frame body 3.

The front wheel arrangement 11 is coupled to the frame body 3 by a front hinge 18 having a rotational axis extending in the transverse direction, T, of the passenger carrier 1. The front wheel arrangement 11 allows the front wheel 12 to be rotated or folded in under the frame body 3.

A front wheel locking mechanism may be provided to allow the front wheel to be adjusted depending on the intended use of the passenger carrier. The wheel locking mechanism can preferably be set to three different and distinct positions wherein a first position which may be suitable when the passenger carrier 1 is used in the push-carrier mode by a walking person, a second position, which may be suitable when the passenger carrier 1 is used in the push-carrier mode by a running person and a third position, which may be suitable when the passenger carrier 1 is used in the trailer mode or when it is folded together for transport or storage.

The wheel locking mechanism may be any suitable wheel locking mechanism 20 as known in the art, such as a wheel locking mechanism comprising a spring-loaded locking pin being arranged to engage with corresponding locking holes or cavities placed at appropriate locations in a locking plate or other receiving member. An example of a locking arrangement of this kind is disclosed in CN201350918.

When the wheel locking mechanism is set to the first position, the wheel 12 is in a free-wheel position allowing full rotation of the wheel around the pivot axle 19 and making the passenger carrier 1 easy to steer. When the wheel locking mechanism is set to the second position, the wheel 12 is locked in a position parallel to the longitudinal direction, L, of the passenger carrier 1 as shown in FIG. 1 and cannot rotate around the pivot axle 19, making the passenger carrier 1 travel straight forward without inadvertently turning or wobbling when pushed by a jogging or running person. When the wheel locking mechanism is set to the third position, the wheel 12 is locked in a position parallel to the transverse direction, T, of the passenger carrier 1 and cannot rotate around the pivot axle 19. The third position may be selected when the passenger carrier 1 is to be used in the trailer mode. The third position may also be used as a braking position, when parking the passenger carrier 1 as the passenger carrier can only rotate on the spot without moving forwards or backwards when the front wheel is locked in a transverse position. The third position may further be used simply to shorten the passenger carrier, for instance when parking or storing it in a limited space.

A front wheel locking mechanism is an optional feature of the invention. Furthermore, a wheel locking mechanism may have only one or two locking positions.

In addition, any front wheel or rear wheel on the passenger carrier may be provided with means allowing them to be completely removed from the carrier frame. A removable front wheel may be foldable as described above so that a user may choose between removing the wheel and just folding it out of the way, in under the carrier frame.

A single control mechanism 21 is arranged centrally on the push-handle 13 for controlling both the locking mechanism in the handle adjustment hinges 15 and the locking mechanism in the frame element folding hinges 16. The control mechanism 21 is operated by a control button 22 which is coupled to wires extending inside the carrier frame 2 between the control mechanism 21 and the adjustment hinges 15 and between the adjustment hinges and the folding hinges 16 so that the adjustment hinges 15 and folding hinges 16 are coupled in series.

Figure 2A:
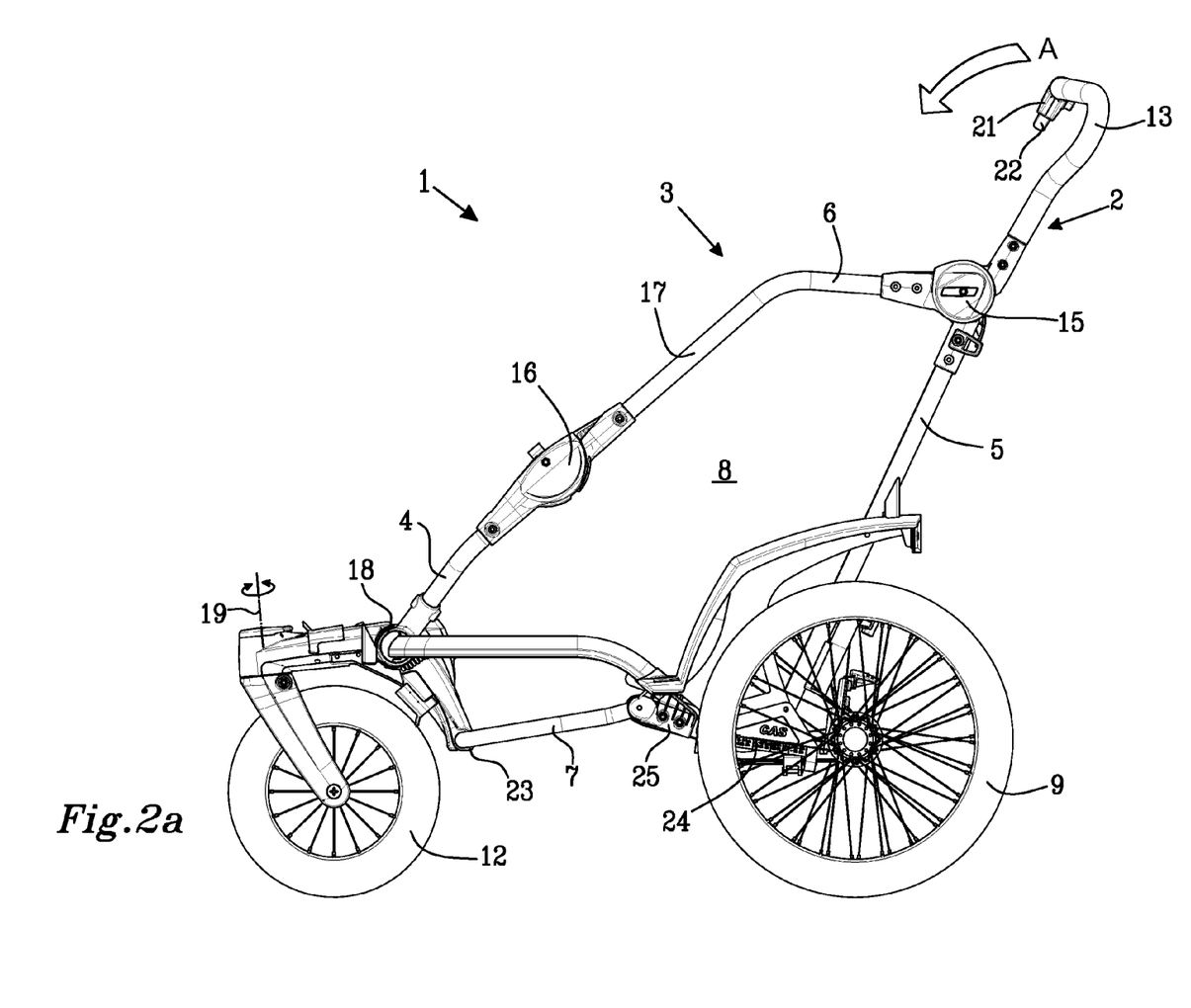
FIG. 2a shows a side view of the passenger carrier in FIG. 1.
Figure 2B:
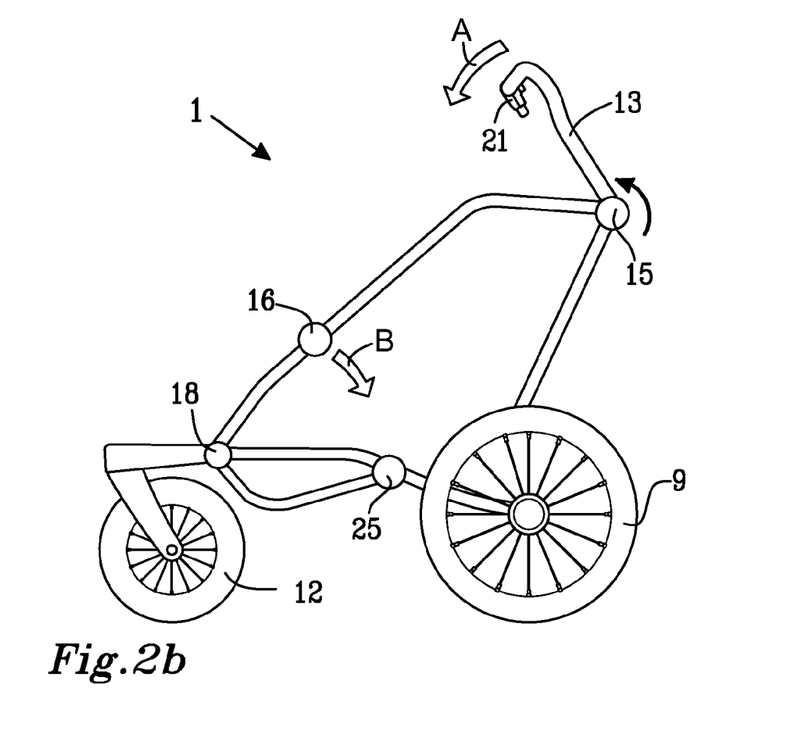
FIG. 2b shows a side view of the passenger carrier in FIG. 1 with the push-handle folded forward.
Figure 2C:
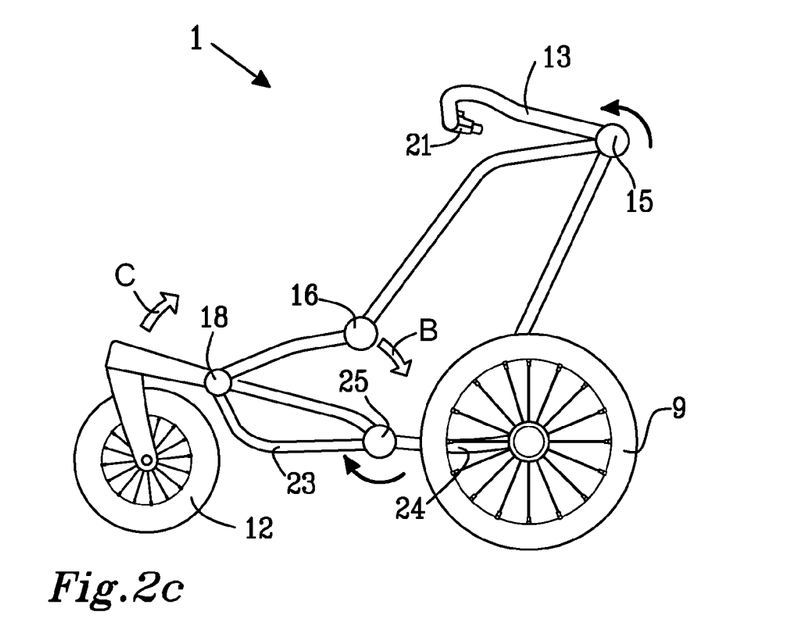
FIG. 2c shows a side view of the passenger carrier in FIG. 1, with the push-handle folded forward and the carrier frame partially collapsed.

The lower front part 23 of the of the carrier frame 2, carrying the front wheel 12, is coupled to the lower rear part 24 of the carrier frame 2 at first front part hinges 25 and is provided with second front part hinges 26 arranged below the wheel arrangement front hinge 18. The front part hinges 25, 26 allow the lower front part 23 or foot well to be rotated in a rearward, upward direction as indicated by the arrow C in FIG. 2c.

When folding the passenger carrier 1 into a compact transport and storage configuration, the locking mechanism in the adjustment hinges 15 is released by pressing the control button 22, whereafter the handle 13 is released for adjustment. By pushing the handle forward, it is caused to rotate around a transverse axis through the adjustment hinges 15 in a direction forward and downward as indicated by the arrow A in FIGS. 2a and 2b. Folding of the handle 13 forwards triggers the locking mechanisms in the folding hinges 16 causes the locking mechanisms to be released so that the longitudinal frame elements 17 may fold or buckle at the folding hinges 17 in a direction towards the lower part 7 of the carrier frame 2 as indicated by the arrow B in FIGS. 2b and 2c. At the same time as the upper part 6 of the frame body 3 collapses by folding of the longitudinal frame elements 17, the lower front part 23 of the of the carrier frame 2 together with the front wheel 12, is caused to rotate around the front part hinges 25 and to move in a rearward and upward direction in relation to the rear part 5 of the carrier frame 2 as indicated by the arrow C in FIG. 2c.

Figure 3:
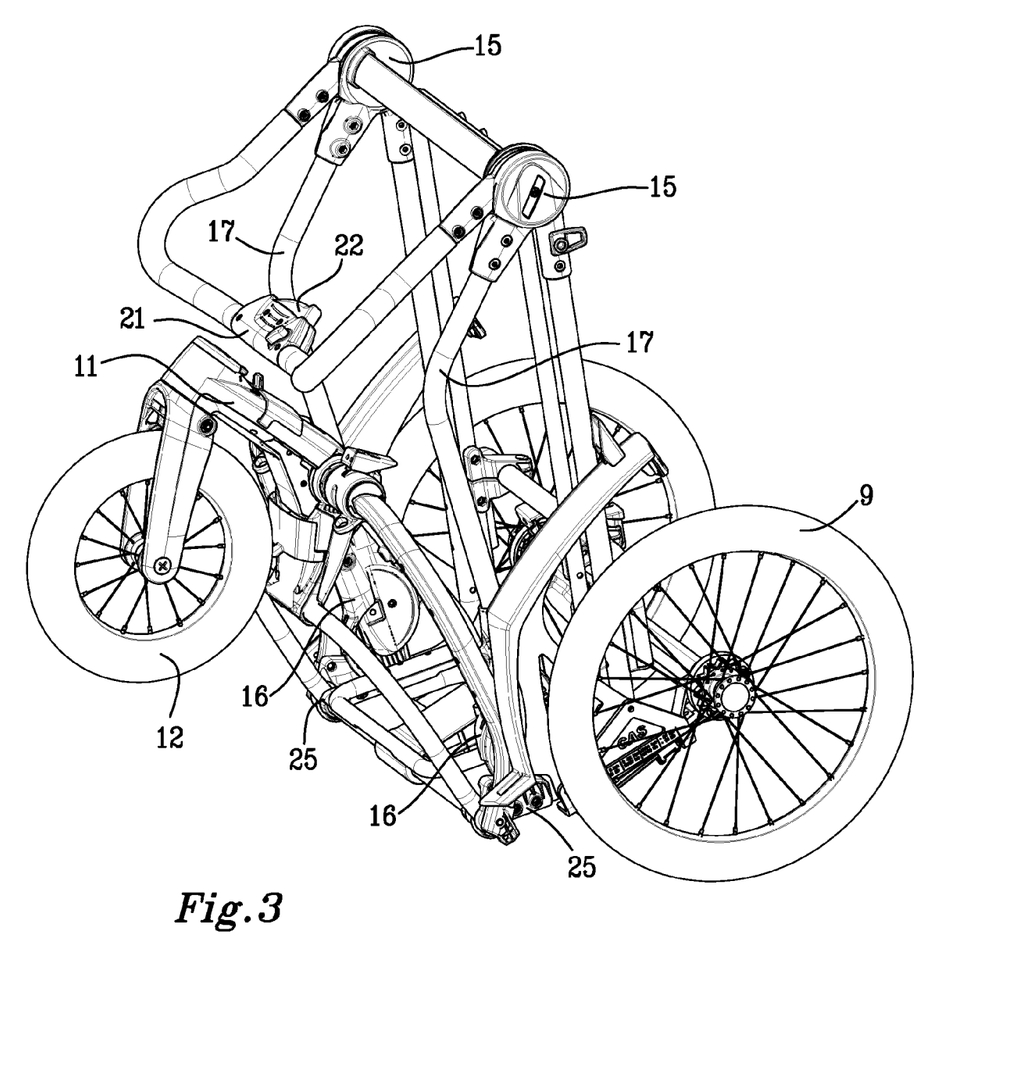
FIG. 3 shows a first perspective view of a passenger carrier according to the invention in a folded state.

When the passenger carrier 1 is in a completely folded state it will appear as shown in FIG. 3, with the frame body 3 collapsed and the push-handle 13 and the lower front part 23 of the of the carrier frame 2 folded in over the collapsed frame body 3.

Figure 4:
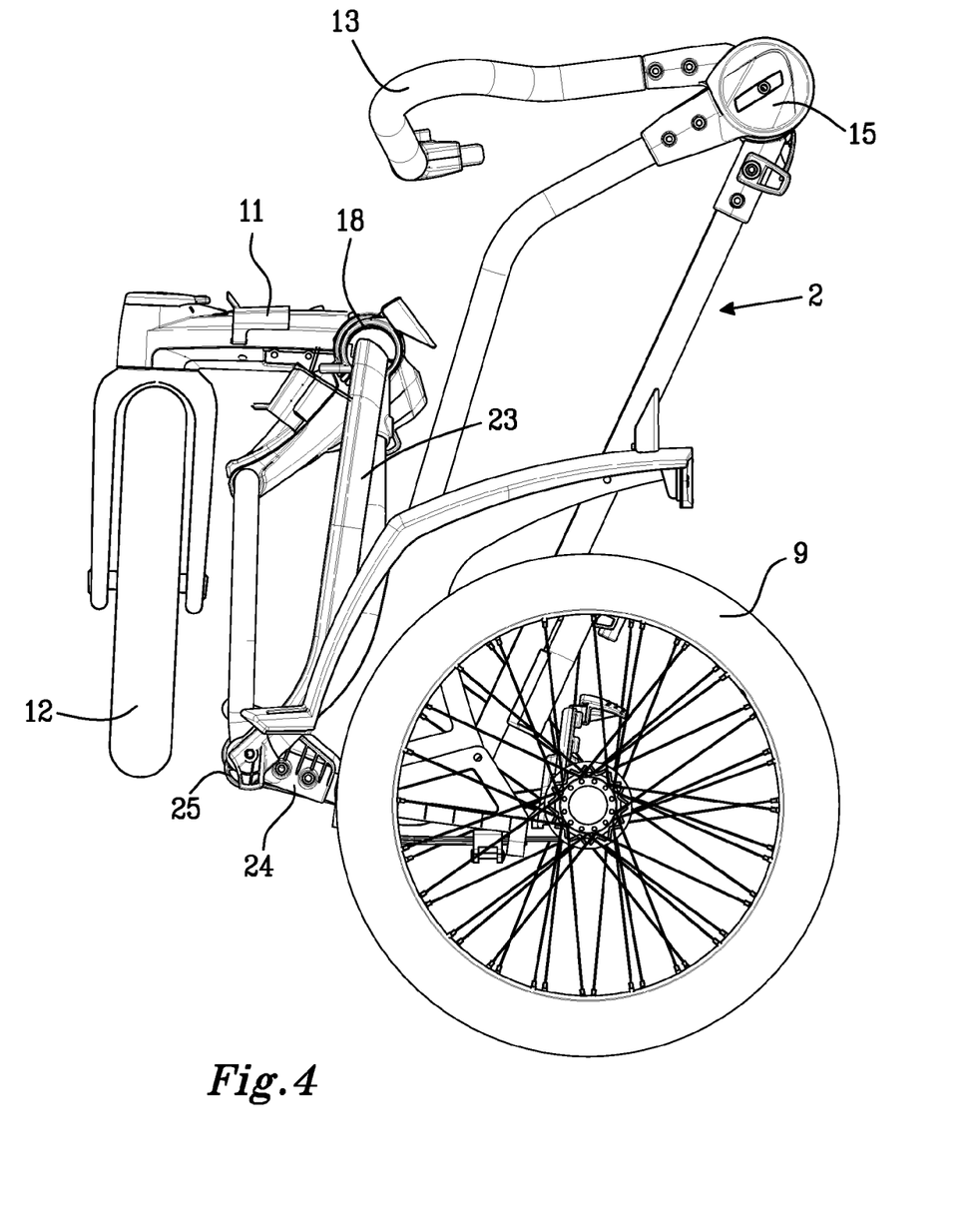
FIG. 4 shows a second perspective view of a passenger carrier according to the invention in a folded state with a folded-in front wheel.

FIG. 4 shows the passenger carrier 1 in an even further compacted state, which the front wheel 12 locked in a direction transverse to the travelling direction and folded into a storage position on the underside of the carrier frame 2. Folding of the front wheel 12 is carried out by rotating the front wheel arrangement 11 around a transverse axis through the front hinge 18. The front wheel arrangement may comprise means for releasably locking the front wheel 12 in the storage position shown in FIG. 4.

Accordingly, the carrier frame 2 can be folded for storage and transport either with the front wheel 12 folded away in the storage position shown in FIG. 4 or with the front wheel in the in-use position, as shown in FIG. 3.

Foldability of the front part of the carrier frame 2 and of the front wheel arrangement are optional features of a passenger carrier of the invention. Furthermore, the specific shape and construction of the push-handle 13 that is shown in FIG. 1 should not be considered limiting to the invention, as many other shapes may be envisaged by a person skilled in the art. It is also to be understood that the shape and construction of the passenger carrier frame 2 may be different from that shown in FIG. 1. For instance, the shape of the passenger compartment may be different; the passenger carrier may have more than one front wheel, only one longitudinal frame element may be provided in the upper part of the carrier frame or the carrier frame may comprise more than two longitudinal frame elements in the upper part of the carrier frame, etc.

However, in order for the passenger carrier to be foldable as set out herein, all longitudinal frame elements in the upper part of the carrier frame must comprise lockable and releasable locking mechanisms. Preferably, all such locking mechanisms are controlled by a single control mechanism, although multiple control mechanisms may be envisaged. For example, the passenger carrier of the invention may have two handles placed one on each side of the passenger compartment and each having a control mechanism controlling the handle adjustment hinge and a folding hinge in a longitudinal frame element being connected to the handle. The passenger carrier may also comprise all types of accessory equipment such as passenger seats, lights, luggage, holders, etc. as known in the art.

The invention claimed is:

1. A foldable passenger carrier, such as an infant stroller, comprising a carrier frame and having a longitudinal direction constituting a travelling direction of said passenger carrier, a transverse direction perpendicular to said longitudinal direction and a height direction perpendicular to said longitudinal direction and to said transverse direction;

said carrier frame comprising a frame body having a forward part, a rear part, an upper part, and a lower part;

said upper part of said frame body comprising a longitudinal frame element, said longitudinal frame element comprising a folding hinge comprising a first locking mechanism;

said carrier comprising a push-handle connected to said upper part of said frame body and comprising a handle adjustment hinge, the handle adjustment hinge comprising a second locking mechanism, and a control mechanism arranged on the push-handle, the control mechanism interconnected to and adapted to control the first locking mechanism;

wherein said push-handle is foldable at said handle adjustment hinge in a first rotational direction about a transverse axis through said adjustment handle hinge and towards said forward part of said frame body;

said longitudinal frame element foldable in a direction towards said lower part of said frame body about a transverse axis through said folding hinge;

wherein said first rotational direction comprises a forward and downward component with respect to said carrier frame such that the push-handle is rotated to a position proximal said upper part;

wherein the folding of the push-handle in the first rotational direction towards said forward part of said frame body activates the first locking mechanism such that the longitudinal frame element folds at said folding hinge and toward said lower part of said frame body; and wherein said lower part and an associated front wheel are caused to simultaneously fold and rotate about at least one hinge such that the lower part rotates in a direction opposite said first rotational direction.

2. The foldable passenger carrier according to claim 1, wherein said push-handle comprises a handle bar extending in said transverse direction of said passenger carrier and being connected to said upper part of said frame body at two adjustment hinges each comprising a locking mechanism.

3. The foldable passenger carrier according to claim 1, wherein said upper part of said frame body comprises two longitudinal frame elements, each longitudinal frame element comprising a folding hinge comprising a locking mechanism.

4. The foldable passenger carrier according to claim 1, wherein said passenger carrier comprises a single manually operated control mechanism acting on all locking mechanisms in said hinges.

5. The foldable passenger carrier according to claim 4, wherein said single control mechanism is arranged on said push-handle.

6. The foldable passenger carrier according to claim 4, wherein said single control mechanism is connected to said locking mechanisms in said hinges by means of wires arranged in said carrier frame.

7. The foldable passenger carrier according to claim 2, wherein said locking mechanisms in said hinges are coupled in series.

8. The foldable passenger carrier according to claim 1, wherein said carrier comprises a front wheel arranged on said forward part of said carrier frame, said front wheel being pivotably attached to said frame body by means of a connecting member comprising a front hinge and said front wheel being foldable towards said rear part of said frame body, in under said lower part of said frame body.

9. The foldable passenger carrier according to claim 1, wherein said carrier comprises a front wheel arranged on said forward part of said frame body and wherein said front wheel is removably attached to said frame body.

10. The foldable passenger carrier according to claim 1, wherein a lower front part of said carrier frame is connected to a lower rear part of said carrier frame at front part hinges and whereby said lower front part of said carrier frame is arranged to be rotated at said front part hinges in a rearward and upward direction towards said lower rear part of said carrier frame.

11. The foldable passenger carrier according to claim 1, wherein said carrier is a multi-function push-carrier and bicycle trailer.

12. The method for folding a foldable passenger carrier according to claim 1, said method including the steps of:
 a) releasing said locking mechanism or said locking mechanisms in said handle adjustment hinge or said handle adjustment hinges;
 b) folding said push-handle at said adjustment hinge or said adjustment hinges towards said front part of said frame body;
 c) releasing said locking mechanism or said locking mechanisms in said longitudinal frame element folding hinge or folding hinges; and
 d) folding said longitudinal frame element or frame elements at said folding hinge or folding hinges towards said lower part of said frame body.

13. The method according to claim 12, wherein steps a) and c) are performed simultaneously.

14. The method according to claim 12, wherein steps b) and d) are performed simultaneously.

15. The method according to claim 12, wherein said foldable passenger carrier comprises a front wheel being connected to said frame body by means of a connecting member comprising a front hinge and said method comprises the further step of folding said front wheel at said front hinge towards said rear part of said frame body, in under said lower part of said frame body.

16. The method according to claim 12, wherein said method comprises the further step of folding a lower front part of said carrier frame which is connected to a lower rear part of said carrier frame at front part hinges in a direction towards said lower rear part of said carrier frame at said front part hinges.

17. The foldable passenger carrier according to claim 1, wherein said hinges are connected by means of wires arranged in said carrier frame.

* * * * *

UNITED STATES PATENT AND TRADEMARK OFFICE
CERTIFICATE OF CORRECTION

Page 1 of 1

PATENT NO. : 9,050,989 B2
APPLICATION NO. : 13/629150
DATED : June 9, 2015
INVENTOR(S) : Wesley Justin Fleming et al.

It is certified that error appears in the above-identified patent and that said Letters Patent is hereby corrected as shown below:

In Item (72) of the Title Page, inventor David Anderson was omitted.

Signed and Sealed this
Twelfth Day of July, 2016

Michelle K. Lee
*Director of the United States Patent and Trademark Office*